(12) United States Patent
Austin et al.

(10) Patent No.: US 6,815,515 B2
(45) Date of Patent: Nov. 9, 2004

(54) COLORLESS POLYMALEATES AND USES THEREOF

(75) Inventors: Anne-Marie Austin, Signal Mountain, TN (US); Allen M Carrier, Hisxon, TN (US); Klein A Rodrigues, Signal Mountain, TN (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 43 days.

(21) Appl. No.: 10/082,903

(22) Filed: Feb. 25, 2002

(65) Prior Publication Data

US 2002/0123584 A1 Sep. 5, 2002

Related U.S. Application Data

(62) Division of application No. 09/714,645, filed on Nov. 16, 2000, now Pat. No. 6,384,166.

(51) Int. Cl.$^7$ .............................................. C08F 130/04
(52) U.S. Cl. ................ 526/240; 525/327.5; 525/327.8; 526/287
(58) Field of Search ............................... 526/240, 287, 526/327.5, 327.8

(56) References Cited

U.S. PATENT DOCUMENTS

| | | | |
|---|---|---|---|
| 4,519,920 A | 5/1985 | Fukumoto et al. | 210/701 |
| 4,555,557 A | 11/1985 | Fukumoto et al. | 526/240 |
| 4,589,995 A | 5/1986 | Fukumoto et al. | 252/180 |
| 4,659,793 A | 4/1987 | Yang | 526/91 |
| 4,668,735 A | 5/1987 | Fukumoto et al. | 524/804 |
| 4,709,091 A | 11/1987 | Fukumoto et al. | 562/595 |
| 5,064,563 A | 11/1991 | Yamaguchi et al. | 252/174.23 |
| 5,135,677 A | 8/1992 | Yamaguchi et al. | 252/180 |
| 6,020,297 A | 2/2000 | Austin et al. | 510/361 |

Primary Examiner—Bernard Lipman
(74) Attorney, Agent, or Firm—David P. LeCroy

(57) ABSTRACT

A low color or colorless polymaleate as determined by a Gardner color number of 8 or less, said polymaleate is prepared by aqueous solution polymerization of 70 to 99.9 weight percent of maleic acid, 0.1 to 30 weight percent of an allylic sulfonate monomer, and 0.5 to 50 $\mu$m, based on the moles of monomer, of a polyvalent transition metal ion selected from group consisting of Group IVA, VA, VIA, VIIA, VIIIA, IB, IIB, and combinations thereof, wherein the weight percents are based on the total weight of monomer, provided that 10 to 60 mole percent of the carboxylic acid groups on the maleic acid are neutralized prior to polymerization. The low color or colorless polymaleates provide permanent press properties to textiles treated therewith and increases the resistance of such textiles to laundering abrasion. The polymaleates also may be used in cleaning compositions to disperse and suspend soils.

9 Claims, No Drawings

COLORLESS POLYMALEATES AND USES THEREOF

CROSS-REFERENCE TO RELATED APPLICATIONS

This application is a divisional of application Ser. No. 09/714,645, filed Nov. 16, 2000, now U.S. Pat. No. 6,384,166.

FIELD OF THE INVENTION

This invention relates to a low color or colorless polymaleate which is prepared by aqueous solution polymerization of maleic acid, an allylic sulfonate monomer, and a polyvalent transition metal ion. The polymaleates are useful as permanent press agents for textiles, and in laundry detergents to minimize calcium carbonate encrustation.

BACKGROUND OF THE INVENTION

Polymaleates are commonly used as water treatment agents, dispersing agents, and chelating agents in applications where color of the polymer is not critical. Since polymaleates generally appear dark brown in color, such polymers are inappropriate for many detergent and textile applications where low color is desirable. This is especially true where the polymer is to be applied to a textile, for example, as a durable press resin where a high color polymer may cause undesired color formation on the textile.

There are many processes for preparing polymaleates and copolymers thereof, for example, such processes are disclosed in U.S. Pat. Nos. 5,135,677; 5,064,563; 4,519,920; 4,555,557; 4,668,735; 4,589,995; and 4,659,793 wherein the polymaleates are prepared in an organic solvent or water. Unfortunately, these processes yield polymaleates which appear dark in color as evidenced by Gardner color number of greater than 8.

U.S. Pat. No. 4,709,091 describes a process for preparing polymaleic acid which involves neutralizing maleic acid in an aqueous medium with an alkali metal hydroxide or ammonia, polymerizing the maleic acid in the presence of an initiator, and adding a further amount of the alkali metal hydroxide or ammonia. U.S. Pat. No. 4,709,091 suggests that sulfonate comonomers may be used along with the maleic acid. The polymalic acid polymers, however, appear dark in color as evidenced by Gardner color number of greater than 8.

U.S. Pat. No. 6,020,297 describes the present invention. A terminal disclaimer has been included with the present application in regard to this prior art.

SUMMARY OF THE INVENTION

It has now been discovered that a low color or colorless polymaleate, as determined by a Gardner color number of 8 or less, may be prepared by aqueous solution polymerization comprising:

(a) 70 to 99.9 weight percent of maleic acid;
(b) 0.1 to 30 weight percent of an allylic sulfonate monomer having the formula

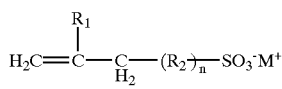

wherein $R_1$ is selected from the group consisting of H, $C_1$–$C_4$ alkyl, $C_1$–$C_6$ alkoxy, $C_6$–$C_{10}$ aryl, ester, and COOH; $R_2$ is O—$R_3$ wherein $R_3$ is selected from the group consisting of $C_1$–$C_4$ alkyl, $C_1$–$C_6$ alkoxy, and $C_6$–$C_{10}$ aryl; n is from 0 to 1; and $M^+$ is a cation selected from the group consisting of $H^+$, $NH_4^+$, alkali metals, alkaline earth metals, and quaternary organic amines; and (c) 0.5 to 50 μm, based on the moles of monomer, of a polyvalent transition metal ion selected from group consisting of Group IVA, VA, VIA, VIIA, VIIIA, IB, IIB, and combinations thereof;

wherein the weight percents are based on the total weight of monomer, provided that 10 to 60 mole percent of the carboxylic acid groups on the maleic acid are neutralized prior to polymerization.

According to an additional aspect the invention provides a method for imparting permanent press properties to a textile containing cellulose fibers wherein said method comprises (I) adding an aqueous solution of the low color or colorless polymaleate to a laundering process comprising at least one textile; and (II) heating the textile at a sufficient temperature for a sufficient time to react the polymaleate with the textile wherein water is removed from the textile, to impart permanent press properties to the textile. Optionally, the polymaleate is combined with a catalyst prior to Step (II).

According to an additional aspect the invention provides a low color or colorless polymaleate as determined by a Gardner color number of 8 or less, said polymaleate is prepared by aqueous solution polymerization comprising 70 to 100 weight percent, based on the total weight of monomer, of maleic acid; and 0.5 to 50 μm, based on the moles of monomer, of a polyvalent transition metal ion selected from group consisting of Group IVA, VA, VIA, VIIA, VIIIA, IB, IIB, and combinations thereof; provided that 40 to 55 mole percent of the carboxylic acid groups on the maleic acid are neutralized prior to polymerization.

The low color or colorless polymaleate of the present invention provides permanent press properties to textiles treated therewith and increases the resistance of such textiles to laundering abrasion. Such treated textiles display a significant reduction in wrinkles compared with nontreated textiles. Moreover, the treated textiles have a tactile sensation of feeling soft and retain their smoothness after laundering.

According to a further aspect the invention provides a cleaning composition containing a surfactant and the polymaleate. The polymaleate enhances or "builds" the cleaning efficiency of a surfactant by inactivating hardness ions such as calcium and magnesium, and other metal ions such as iron. The polymaleates soften water by sequestration. In addition, the polymaleates assist in cleaning by dispersing and suspending soils to prevent the redeposition of soils onto cleaned substrates. Fabrics washed with detergent compositions containing the polymaleate of the invention have much less calcium carbonate deposited on the fabric as compared to fabrics washed without the polymaleate. Moreover, fabrics washed with detergent compositions containing the polymaleate of the invention display significantly less graying as compared to fabrics washed with detergent compositions without the polymaleates of the invention.

DESCRIPTION OF THE INVENTION

The low color or colorless polymaleate as determined by a Gardner color number of 8 or less is prepared by aqueous solution polymerization of (a) 70 to 99.9 weight percent of maleic acid, (b) 0.1 to 30 weight percent of an allylic sulfonate monomer, and (c) 0.5 to 50 μm, based on the moles of monomer, of a polyvalent transition metal ion selected from group consisting of Group IVA, VA, VIA, VIIA, VIIIA, IB, IIB, and combinations thereof. The weight percents of the maleic acid and allylic sulfonate monomer are based on the total weight of monomer used to prepare the polymaleate.

In another embodiment of the invention, a low color or colorless polymaleate as determined by a Gardner color number of 8 or less is prepared by aqueous solution polymerization of 70 to 100 weight percent, based on the total weight of monomer, of maleic acid; and 0.5 to 50 $\mu$m, based on the moles of monomer, of a polyvalent transition metal ion selected from group consisting of Group IVA, VA, VIA, VIIA, VIIIA, IB, IIB, and combinations thereof, provided that 40 to 55 mole percent of the carboxylic acid groups on the maleic acid are neutralized prior to polymerization.

As used herein, "polymaleate" includes copolymers and terpolymers, etc., of maleic acid. Preferably, the amount of maleic acid which is used to prepare the polymaleate is greater than 80 weight percent, more preferably greater than 90 weight percent, based on the total weight of monomers. Most preferably, the amount of maleic acid monomer which is used to prepare the polymaleate is greater than 98 weight percent. Preferably, the amount of allylic sulfonate monomer which is used to prepare the polymaleate is less than 20 weight percent, more preferably 8 or less weight percent, based on the total weight of monomers. Most preferably, the amount of allylic sulfonate monomer which is used to prepare the polymaleate is less than 2 weight percent.

The maleic acid may be present as maleic acid and/or maleic anhydride. In the embodiment of the invention wherein an allylic sulfonate comonomer is used with the maleic acid, 10 to 60 mole percent of the carboxylic acid groups on the maleic acid are neutralized prior to polymerization. Preferably 20 to 50 mole percent, more preferably 30 to 40 mole percent, of the carboxylic acid groups on the maleic acid are neutralized prior to polymerization.

The allylic sulfonate monomer has the formula

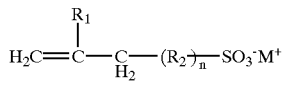

wherein $R_1$ is selected from H, $C_1$–$C_4$ alkyl, $C_1$–$C_6$ alkoxy, $C_6$–$C_{10}$ aryl, ester, and COOH; $R_2$ is O—$R_3$ wherein $R_3$ is selected from $C_1$–$C_4$ alkyl, $C_1$–$C_6$ alkoxy, and $C_6$–$C_{10}$ aryl; n is from 0 to 1; and $M^+$ is a cation selected from $H^+$, $NH_4^+$, alkali metals, alkaline earth metals, and quaternary organic amines. Preferred alkali metals are sodium and potassium. Particularly preferred allylic sulfonate monomers are sodium methallyl sulfonate, sodium allyl sulfonate, and sodium 1-allyloxy-2-hydroxypropyl sulfonate.

In one embodiment of the invention, the allylic sulfonate monomer is sodium methallyl sulfonate having the formula

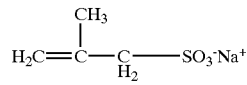

In one embodiment of the invention, the allylic sulfonate monomer is a copolymerizable surfactant having the formula

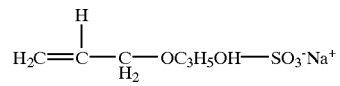

In the embodiment of the invention wherein a comonomer is not used with the maleic acid, 40 to 55 mole percent of the carboxylic acid groups on the maleic acid are neutralized prior to polymerization. Preferably 45 to 50 mole percent of the carboxylic acid groups on the maleic acid are neutralized prior to polymerization.

The polyvalent transition metal ion is used to prepare the polymaleates of the invention in an amount of from 0.5 $\mu$m to 50 $\mu$m, based on total moles of monomer used to prepare the polymaleate. Suitable polyvalent transition metal ions are selected from Group IVA, VA, VIA, VIIA, VIIIA, IB, and Group IIB transition metal ions. Combinations of transition metal ions may also be used. Preferably the transition metal ion is selected from vanadium ions, iron ions, and copper ions. The polyvalent transition metal ion is preferably used in an amount of from 1.6 to 33.2 $\mu$m, and more preferably 8.3 to 16.6 $\mu$m. If the amount of polyvalent transition metal ion used is less than 0.5 $\mu$m, the residual monomer level in the polymaleate is unacceptable. If the amount of polyvalent transition metal ion used is greater than 50 $\mu$m, the color of the polymaleate is unacceptable as determined by a Gardner color number of greater than 8.

In one embodiment, the polymaleate is used to impart permanent press properties to a textile containing cellulose fibers. As used herein, "permanent press" shall be synonymous with wrinkle resistance, durable press, dimensional stability, shrinkage resistance, and wrinkle recovery. An aqueous solution of the polymaleate is applied to a textile, and the textile is heated in the presence of a catalyst at a sufficient temperature for a sufficient time to react the polymaleate with the textile wherein water is removed from the textile, to impart permanent press properties to the textile. The polymaleate may be applied in the form of an aqueous solution or sprayed.

Any method of applying the polymaleate to the textile is acceptable. Preferably, the textile is impregnated with an aqueous solution of the polymaleate. As used herein, "impregnate" refers to the penetration of the solution into the fiber matrix of the textile, and to the distribution of the solution in a preferably substantially uniform manner into and through the interstices in the textile. The solution therefore preferably envelopes, surrounds, and/or impregnates individual fibers substantially through the thickness of the textile as opposed to only forming a surface coating on the textile.

In a preferred embodiment of the invention, the aqueous solution of the polymaleate is applied to the textile in a textile manufacturing process as part of the durable press finishing operation.

The textiles may be woven or non-woven fabrics and include 100% cellulosic fabrics, for example, cotton, rayon, and linen, as well as blends, for example, polyester/cotton or polyester/rayon. Such blends preferably contain at least 20% of cellulose. Both white and colored (printed, dyed, yarn-dyed, cross-dyed, etc.) fabrics can be effectively treated with the polymaleate of this invention. The textiles may comprise new or used clothing including previously worn clothing and/or laundered clothing. Preferably, the textiles contain free hydroxyl groups.

A catalyst may be used to speed up the reaction between the polymaleate and textile. The catalyst also increases the degree of crosslinking in the reaction of the carboxyl groups on the polymaleate and hydroxyl groups on the textile. While not wishing to be bound by any theory, the inventors believe that the catalyst decreases the zeta potential or the amount of negative charge on the textile surface and thus increases the amount of polymaleate which is deposited on the textile or fabric from the aqueous solution. Any substance that can accept an electron pair from a base can be used as a catalyst.

Preferably, the catalyst is a Lewis acid catalyst selected from dibutyltindilaurate, iron(III)chloride, scandium(III) trifluoromethanesulfonic acid, boron trifluoride, tin(IV) chloride, $Al_2(SO_4)_3 \cdot xH_2O$, $MgCl_2 \cdot 6H_2O$, $AlK(SO_4)_2 \cdot 10H_2O$, and Lewis acids having the formula $NX_p$ wherein N is a metal, X is a halogen atom or an inorganic radical, and p is an integer of from 1 to 4, such as $BX_3$, $AlX_3$, $FeX_3$, $GaX_3$, $SbX_3$, $SnX_4$, $AsX_5$, $ZnX_2$, and $HgX_2$. More preferably, the Lewis acid catalyst is selected from $Al_2(SO_4)_3 \cdot xH_2O$, $MgCl_2 \cdot 6H_2O$, $AlK(SO_4)_2 \cdot 10H_2O$. A combination of catalysts can also be used in the method of the invention.

The treated textile is cured at the normal temperatures provided by either a drying unit used in a textile manufacturing process such as a steam heated drying cylinder, an oven, or an iron. Drying temperatures generally range from about 90° C. to about 300° C. Such temperatures permit water to be removed, thereby inducing crosslinking between the polymaleate and textile.

The residence time of the textile in the dryer unit, oven, or in contact with an iron ranges from about 1 second to about 200 seconds, depending on the temperature. The actual residence time for a particular textile sample depends on the temperature, pressure, type of fabric, and the type and amount of catalyst. Preferably, the time and temperature required to cure the polymaleate with the textile ranges from about 2 to about 60 seconds at a textile temperature ranging from about 100° C. to about 250° C. After the textile with the solution of the polymaleate applied thereto is dried/cured, subsequent coatings or additives may be applied.

In a preferred embodiment, a textile treated with the polymaleate is ironed both on the inside and outside surfaces to maximize the amount of crosslinking and thus permanent press properties of the textile.

Preferred means of applying the aqueous solution of the polymaleate on a textile manufacturing machine are by puddle press, size press, blade coater, speedsizer, spray applicator, curtain coater and water box. Preferred size press configurations include a flooded nip size press and a metering blade size press.

Preferred means of applying the aqueous solution of the polymaleate on off-machine coating equipment in a textile manufacturing process are by rod, gravure roll and air knife. The solution may also be sprayed directly onto the textile or onto rollers which transfer the solution to the textile. In an especially preferred embodiment of the invention, impregnation of the textile with the aqueous solution of the polymaleate occurs by means of a puddle size press.

Preferred means of applying the aqueous solution of the polymaleate in a laundering process are by adding the solution to the rinse water during the rinse cycle in the laundering process. In an especially preferred embodiment of the invention, impregnation of the textile with the aqueous solution of the polymaleate occurs during the final rinse cycle in a laundering process. In an additional especially preferred embodiment of the invention, impregnation of the textile with the aqueous solution of the polymaleate occurs in a washing machine which contains at least one textile, the polymaleate and optionally a catalyst, wherein the washing machine is not operating so that the textile remains in contact with the treatment solution for a period of time to facilitate the impregnation of the treatment solution into the textiles. The washing machine is turned on to the spin cycle, the textiles are removed, dried and ironed.

Another preferred means of applying the aqueous solution of the polymaleate to a textile such as clothing is spraying by means of a pump or aerosol a solution of the polymaleate onto the textile and then ironing the textile.

The concentration of the polymaleate in the aqueous solution is sufficient to provide from about 0.1 to about 10 weight percent of polymaleate in the textile based on the oven-dry weight of the textile. Preferably, the concentration of polymaleate in the aqueous solution is sufficient to provide from about 1 to about 5 weight percent, more preferably from about 2 to about 4 weight percent of polymaleate in the textile based on the oven-dry weight of the textile.

In another embodiment, the low color or colorless polymaleates are used in a cleaning composition. The concentration of polymaleate in the cleaning composition is from 0.1 to 50 weight percent, preferably 0.5 to 20, based on the total weight of the cleaning composition. Examples of cleaning compositions are laundry detergents, prespotters, dishwashing detergents, and hard surface cleaners. Examples of articles which may be cleaned using the cleaning compositions are fabrics, such as clothing, linens, carpets, or upholstery; hard surfaces such as countertops, windows, floors, dishes, glasses or tiles; or automobiles.

The cleaning composition may be a solid or liquid composition. If the cleaning composition is solid, the cleaning composition may be in any of the usual physical forms, such as for example, powders, beads, flakes, bars, tablets, noodles, pastes, and slurries. If the cleaning composition is liquid, the cleaning composition preferably disperses or solubilizes the polymaleate. The cleaning composition may be aqueous or nonaqueous. For example, the polymaleate may be dissolved or dispersed in water, in one or more solvents or inert diluents. Preferably the cleaning composition is aqueous.

The cleaning compositions may contain any additional components which are used in cleaning compositions. Such additional components are well known to those skilled in the art and include one or more surfactants, builders, ion exchangers, alkalies, anticorrosion materials, antiredeposition materials, optical brighteners, fragrances, dyes, chelating agents, enzymes, whiteners, brighteners, antistatic agents, sudsing control agents, solvents, hydrotropes, bleaching agents, perfumes, bleach precursors, water, buffering agents, soil removal agents, soil release agents, softening agents, opacifiers, inert diluents, buffering agents, corrosion inhibitors, graying inhibitors, anti-redeposition agents, stabilizers, opacifiers, fillers, builders, phosphate co-builder, and phosphate-replacer builder. Combinations of such additional components may also be used.

Preferably cleaning compositions prepared using the polymaleates contain at least one surfactant. Suitable surfactants include nonionic, anionic, cationic, and amphoteric surfactants. The surfactants usable in the cleaning composition may also be soaps.

Anionic surfactants include, for example, from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates or from $C_{12}$ to $C_{16}$ sulfated ethoxylated alkanols.

Nonionic surfactants include, for example, from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Cationic surfactants contain hydrophilic functional groups where the charge of the functional groups are positive when dissolved or dispersed in an aqueous solution. Typical cationic surfactants include, for example, amine compounds, oxygen containing amines, and quaternary amine salts.

Amphoteric surfactants contain both acidic and basic hydrophilic groups. Amphoteric surfactants are preferably derivatives of secondary and tertiary amines, derivatives of quaternary ammonium, quaternary phosphonium or tertiary sulfonium compounds. The cationic atom in the quaternary compound can be part of a heterocyclic ring. The amphoteric surfactant preferably contains at least one aliphatic group, containing about 3 to about 18 carbon atoms. At least one aliphatic group preferably contains an anionic water-solubilizing group such as a carboxy, sulfonate, or phosphono.

Generally, anionic surfactants, such as linear alkyl sulfonates (LAS) are preferred for use in solid cleaning compositions containing the polymaleate. Nonionic and anionic surfactant mixtures such as alcohol ethoxylates and LAS are preferred in liquid cleaning compositions containing the polymaleate. The surfactants are optionally present in an amount of from about 0 to about 50 weight percent, preferably from about 2 to about 45 weight percent, and more preferably from about 5 to about 40 weight percent of the cleaning composition.

Examples of builders which may be present in the cleaning composition include, for example, phosphates, such as pyrophophates, polyphosphates, or sodium tripolyphosphate. Further examples are zeolites, sodium carbonate, poly(carboxylic acids), nitriloacetic acid, citric acid, tartaric acid, the salts of the aforesaid acids and the monomeric, oligomeric, or polymeric phosphonates. Combinations of builders may also be used. The builders are optionally present in an amount of from 0 to about 85 weight percent, preferably from about 5 to about 50 weight percent based on the total weight of the cleaning composition.

Liquid cleaning compositions containing the polymaleate can contain up to 80 weight percent water or solvents or combinations thereof. Typical solvents which may be used include oxygen containing solvents such as alcohols, esters, glycol, and glycol ethers. Alcohols that may be used in the cleaning compositions include, for example, methanol, ethanol, isopropanol, and tertiary butanol. Esters which may be used include, for example, amyl acetate, butyl acetate, ethyl acetate, and esters of glycols. Glycols and glycol ethers that are useful as solvents include, for example, ethylene glycol, propylene glycol, and oligomers of ethylene or propylene glycol.

Solid cleaning compositions containing the polymaleate preferably contain up to 60 weight percent of one or more solid inert diluents such as sodium sulfate, sodium chloride, sodium borate, or selected polymers such as polyethylene glycol or propylene glycol.

In a cleaning composition, the polymaleate enhances or "builds" the cleaning efficiency of a surfactant by inactivating hardness ions such as calcium and magnesium, and other metal ions such as iron. The polymaleates soften water by sequestration. In addition, the polymaleates assist in cleaning by dispersing and suspending soils to prevent the redeposition of soils onto cleaned substrates.

The following nonlimiting examples illustrate further aspects of the invention.

EXAMPLE 1

Preparation of Polymaleate Without Allylic Sulfonate.

A mixture containing 98 g of maleic anhydride, 75 g of water and 14 mg of ferrous ammonium sulfate hexahydrate (10.7 $\mu$m $Fe^{2+}$ based on moles of monomer) were added to a reactor. The reactor was heated to 96° C. to 98° C. and the reaction temperature was maintained for 5 hours. Concurrently, 55 g of a 35% hydrogen peroxide solution was added to the reactor during the 5 hours. After the addition of the hydrogen peroxide was complete, the reaction temperature was maintained at 96° C. to 98° C. for an additional 2 hours to form a polymaleate product.

The polymaleate appeared amber to dark brown in color and was clear. The polymaleate was determined to have a Gardner Color Number of greater than 10.

EXAMPLE 2

Preparation of Sodium Polymaleate Without Allylic Sulfonate.

A mixture containing 98 g of maleic anhydride, 75 g of water, 48 g of 50% NaOH (30 mole % carboxyl groups on the maleic acid were neutralized), 7 mg of ferrous ammonium sulfate hexahydrate (5.4 $\mu$m $Fe^{2+}$ based on moles of monomer) were added to a reactor. The reactor was heated to 96° C. to 98° C. and the reaction temperature was maintained for 5 hours. Concurrently, 55 g of a 35% hydrogen peroxide solution was added to the reactor during the 5 hours. After the addition of the hydrogen peroxide was complete, the reaction temperature was maintained at 96° C. to 98° C. for an additional 2 hours to form a polymaleate product.

The polymaleate appeared amber in color during the polymerization, but upon cooling the residual maleic acid precipitated.

EXAMPLE 3

Preparation of a Low Color Polymaleate with Sodium Methallyl Sulfonate.

A mixture containing 76 grams of maleic anhydride (0.775 mol), 70 g of water, 62 g of a 50% solution of NaOH (50 mole % carboxyl groups on the maleic acid were neutralized), and 5.3 mg of ferrous ammonium sulfate hexahydrate (5.4 $\mu$m $Fe^{2+}$ based on moles of monomer) were added to a reactor. The reactor was heated to 96° C. to 98° C. and the reaction temperature was maintained for 5 hours. The heat of neutralization caused a rapid rise in reaction temperature to 95° C.–98° C. The time duration during which the reactor temperature was at 50° C.–70° C. was minimized to minimize the isomerization of maleic acid to fumaric acid, since the latter is extremely difficult to polymerize. When the temperature reached 96° C., 2.14 grams of sodium methallyl sulfonate (0.0135 mol) was added to the reaction mixture. Concurrently, 55 g of a 35% hydrogen peroxide solution was added to the reactor during the 5 hours. After the addition of the hydrogen peroxide was complete, the reaction temperature was maintained at 96° C. to 98° C. for an additional 2 hours to form a polymaleate polymer product.

The polymaleate appeared pale yellow in color and was clear. The polymaleate was determined to have a Gardner Color Number of <1.

EXAMPLE 4

A polymaleate with sodium methallyl sulfonate was prepared according to the procedure in Example 3 except that 20 mole % of the carboxyl groups on the maleic acid were neutralized instead of 50 mole %.

The polymaleate appeared medium yellow in color and was clear. The polymaleate was determined to have a Gardner Color Number of 6.

EXAMPLE 5

A polymaleate with sodium methallyl sulfonate was prepared according to the procedure in Example 3 except that 40 mole % of the carboxyl groups on the maleic acid were neutralized instead of 50 mole %.

The polymaleate appeared pale yellow in color and was clear. The polymaleate was determined to have a Gardner Color Number of 3.

EXAMPLE 6

Preparation of a low color polymaleate with copolymerizable surfactant (sodium-1-allyloxy-2-hydroxypropylsulfonate).

A mixture containing 76 grams of maleic anhydride (0.775 mol), 70 g of water, 62 g of a 50% solution of NaOH (40 mole % carboxyl groups on the maleic acid were neutralized), and 5.3 mg of ferrous ammonium sulfate hexahydrate (5.4 μm $Fe^{2+}$ based on moles of monomer) were added to a reactor. The reactor was heated to 96° C. to 98° C. and the reaction temperature was maintained for 5 hours. The heat of neutralization caused a rapid rise in reaction temperature to 95° C.–98° C. The time duration during which the reactor temperature was at 50° C.–70° C. was minimized to minimize the isomerization of maleic acid to fumaric acid, since the latter is extremely difficult to polymerize. When the temperature reached 96° C., 5.5 grams of sodium-1-allyloxy-2-hydroxypropylsulfonate (COPS) (1.8 weight % based on total polymer solids) was added to the reaction mixture. Concurrently, 55 g of a 35% hydrogen peroxide solution was added to the reactor during the 5 hours. After the addition of the hydrogen peroxide was complete, the reaction temperature was maintained at 96° C. to 98° C. for an additional 2 hours to form a polymaleate polymer product.

The polymaleate appeared pale yellow in color and was clear. The polymaleate was determined to have a Gardner Color Number of 2.

EXAMPLES 7–9

Preparation of low color polymaleates with sodium methallyl sulfonate according to the procedure set forth in Example 3 except for variations in the amount of neutralization and amount of iron which are described in Table I.

The polymaleates appeared pale yellow in color and were clear. The polymaleates were determined to have Gardner Color Values of 2, <1, and 2, respectively.

EXAMPLES 10–14

Preparation of polymaleates according to the procedure set forth in Example 5 except that different comonomers, as described in Table I, were used with maleic acid. All of the polymaleates precipitated except for Example 12 which was a polymaleate prepared with an allylic sulfonate comonomer.

EXAMPLES 15–17

Preparation of polymaleates according to the procedure set forth in Example 2 except that different comonomers, as described in Table I, were used with maleic acid. All of the polymaleates precipitated except for Example 17 which was a polymaleate prepared with an allylic sulfonate comonomer.

EXAMPLES 18–24

Preparation of polymaleates according to the procedure set forth in Example 1 without a comonomer, except for variations in the amount of neutralization and amount of iron which are described in Table I.

The polymaleates either precipitated or had a Gardner Color Number of greater than 8, except for Example 24 which was 50 mole percent neutralized and 10 ppm of iron. The polymaleate of Example 24 was determined to have Gardner Color Values of 6.

TABLE I

| Polymer | Allylic Sulfonate Monomer wt. % | Appearance/ Gardner Value (GCV) | Residual Maleic Acid % | % Neutralization Conc. $Fe^{2+}$ (based on moles of monomer) |
|---|---|---|---|---|
| Example 1 | NONE | Dark Amber/ GCV = >12 | 1.5% | 0 mole % 10.7 μm $Fe^{2+}$ |
| Example 2 | NONE | Precipitate | | 30 mole % 5.4 μm $Fe^{2+}$ |
| Example 3 | Sodium Methallyl Sulfonate 1.8% | Clear Pale Yellow/ GCV = <1 | 0.96% | 50 mole % 5.4 μm $Fe^{2+}$ |
| Example 4 | Sodium Methallyl Sulfonate 1.8% | Clear Tea Colored/ GCV = 6 | 1.05% | 20 mole % 5.4 μm $Fe^{2+}$ |
| Example 5 | Sodium Methallyl Sulfonate 1.8% | Clear Pale Yellow/ GCV = 3 | 0.62% | 40 mole % 5.4 μm $Fe^{2+}$ |
| Example 6 | Sodium-1-Allyloxy-2-Hydroxypropyl sulfonate | Clear Pale Yellow/ GCV = 2 | 0.50% | 50 mole % 5.4 μm $Fe^{2+}$ |
| Example 7 | Sodium Methallyl Sulfonate | Clear Pale Yellow/ GCV = <1 | 0.597% | 50 mole % 2.7 μm $Fe^{2+}$ |
| Example 8 | Sodium Methallyl Sulfonate | Clear Pale Yellow/ GCV = 2 | 1.32% | 40 mole % 2.7 μm $Fe^{2+}$ |
| Example 9 | Sodium Methallyl Sulfonate | Clear Pale Yellow/ GCV = 5 | | 30 mole % 5.4 μm $Fe^{2+}$ |
| Example 10 | Sodium SulfoPhenyl Methallyl Ether | Precipitate Formed after 1 week | 1.22% | 40 mole % 5.4 μm $Fe^{2+}$ |

TABLE I-continued

| Polymer | Allylic Sulfonate Monomer wt. % | Appearance/ Gardner Value (GCV) | Residual Maleic Acid % | % Neutralization Conc. $Fe^{2+}$ (based on moles of monomer) |
|---|---|---|---|---|
| Example 11 | Acrylamido Methyl Propane Sulfonate, Sodium Salt | Precipitate | | 40 mole % 5.4 μm $Fe^{2+}$ |
| Example 12 | Sodium-1-Allyloxy 2-Hydroxypropyl Sulfonate | Clear Pale Yellow/ GCV = 5 | 0.67% | 40 mole % 5.4 μm $Fe^{2+}$ |
| Example 13 | Allylanisole | Precipitate | | 40 mole % 5.4 μm $Fe^{2+}$ |
| Example 14 | Dimethyl Diallyl Ammonium Chloride | Precipitate | | 40 mole % 5.4 μm $Fe^{2+}$ |
| Example 15 | Allyl Alcohol | Precipitate | | 30 mole % 5.4 μm $Fe^{2+}$ |
| Example 16 | Allyl Methacrylate | Precipitate | | 30 mole % 5.4 μm $Fe^{2+}$ |
| Example 17 | Sodium-1-Allyloxy- 2-Hydroxypropyl Sulfonate | Clear Amber/ GCV = 7 | 0.55% | 30 mole % 5.4 μm $Fe^{2+}$ |
| Example 18 | NONE | Clear Amber/ GCV = 12 | 0.25% | 60 mole % 27 μm $Fe^{2+}$ |
| Example 19 | NONE | Precipitate | | 60 mole % 0.54 μm $Fe^{2+}$ |
| Example 20 | NONE | Clear Tea Colored/GCV = 12 | 1.39% | 40 mole % 5.4 μm $Fe^{2+}$ |
| Example 21 | NONE | Precipitate | | 40 mole % 2.7 μm $Fe^{2+}$ |
| Example 22 | NONE | Precipitate | | 60 mole % 5.4 μm $Fe^{2+}$ |
| Example 23 | NONE | | 27% | 100 mole % 5.4 μm $Fe^{2+}$ |
| Example 24 | NONE | Clear Pale Yellow/ GCV = 6 | 0.734% | 50 mole % 5.4 μm $Fe^{2+}$ |

The test results in Table I show that low color or colorless polymaleates, as determined by a Gardner color number of 8 or less, were prepared with 70 to 99.9 weight percent of maleic acid, 0.1 to 30 weight percent of an allylic sulfonate monomer, and 0.5 to 50 mof a polyvalent metal ion, provided that 10 to 60 mole percent of the carboxylic acid groups on the maleic acid were neutralized prior to polymerization. In addition, the test results in Table I show that low color or colorless polymaleates, as determined by a Gardner color number of 8 or less, were prepared with 100 weight percent of maleic acid without a comonomer, and 0.5 to 50 mof a polyvalent metal ion, provided that 40 to 55 mole percent of the carboxylic acid groups on the maleic acid were neutralized prior to polymerization.

EXAMPLE 25

Procedure for Evaluating Polymaleate Prepared in Example 3 as Permanent Press Agent in Textile Applications.
1. Polymer solutions for two polymaleate samples as prepared in Example 3 were prepared at 8% polymaleic (on solids) and 4% sodium hypophosphite in one sample as a catalyst and aluminum potassium sulfate (AlK(SO$_4$)$_2$.12H$_2$O in aqueous solution as a catalyst in the other sample.
2. The polymaleate was placed into a 1 liter plastic container. The required amount of catalyst was added and deionized water was added until the total weight was 500 g.
3. The polymaleate solution was mixed with a magnetic stirrer until all solids were dissolved and the solution was clear. The solution was removed from the stirrer. A control sample was prepared with no polymaleate polymer or catalyst.
4. For each polymaleate sample and for the control, a piece of the cotton swatch 14"×14", was cut and all selvages from the fabric were removed.
5. The swatches were placed into their respective solutions and allowed to soak for 10 minutes.
6. The swatches were removed from the solutions and placed onto an embroidery hoop, stretching evenly until taut.
7. The hoops containing the swatches were placed into a laboratory oven set at 85° C. for 5 minutes until dry and then removed from the oven.
8. The hoops containing the swatches were placed into a laboratory oven set at 185° C. to cure the carboxyl groups on the polymaleate with the hydroxyl groups on the cotton swatch samples for 2 minutes. The swatches were removed from the oven and allowed to cool.
9. The swatches were removed from the embroidery hoops and washed in a washing machine with 0.9 g/L AATCC standard detergent and a 10 minute regular wash cycle with hot water and a cold rinse.
10. The swatches were dried in a tumble dryer on high heat for 20 minutes. Three white bath towels were added to the dryer along with the swatches for ballast. After 20 minutes, the swatches were removed immediately and set on a flat surface.
11. The smoothness of each swatch was visually observed and recorded. The test results are summarized in Table II.

TABLE II

Permanent Press Finishing on Cotton Swatches.

| Swatch Sample | Polymaleate/ wt. % | AlK(SO$_4$)$_2$·12H$_2$O wt. % | NaH$_2$PO$_2$ wt. % | Result |
|---|---|---|---|---|
| Control | None | 0 | 0 | very wrinkled |
| 1 | Example 3/ 8% | 4% | | very few wrinkles |
| 2 | Example 3/ 8% | | 4% | very few wrinkles |

The test results in Table II show that the cotton swatches pretreated with a polymaleate according to the invention which was prepared with less than 2 weight percent of sodium methallyl sulfonate, and combined with a catalyst were significantly less wrinkled after washing than the control swatch which was not pretreated with a polymaleate.

EXAMPLE 26

Procedure for Evaluating the Polymaleate Prepared in Example 4 for Anti-Encrustation Properties in Commercial Laundry Detergent Formulations:

1. Black cotton interlock fabric available from Test Fabrics Inc. was cut into 7"×7" swatches. Weigh a total of 40 grams (+/−0.2 g) of swatches for each test which is conducted in a tergitometer, trimming one of the swatches in each test as necessary to obtain the desired weight.
2. Add 1 L of water having a hardness: (Ca:Mg=2:1), 150 ppm as calcium carbonate, to each tergitometer.
3. Weigh the required amount of 1.24 g of TIDE powder detergent and 0.9 g of powder bleach into disposable weigh boats.
4. Weigh the specified amount of polymer into weigh boats, typically 4% dry/detergent weight. A control sample was prepared without any polymer.
5. Add the detergent and polymer to the tergitometer pots, and agitate for 30 seconds to homogenize the wash water. Add the fabric to the pots and wash for 10 minutes. During the wash cycle, the water temperature was approximately 93° F., wash time 10 minutes, rinse time 5 minutes, agitator speed 80–100 rpm.
6. At the completion of the wash cycle, the tergitometer pots were drained, and 1 L of the water as described above was used to rinse the swatches for 5 minutes.
7. The swatches were dried in a tumble dryer on high heat for 20 minutes.
8. Steps 2–7 were repeated for a total of 5 wash/dry cycles.
9. From three separate swatches from each tergitometer pot, cut 2"×2" swatches. Weigh each swatch on the analytical balance and place in a labeled specimen cup.
10. Place each small swatch into 20 grams of 10% nitric acid, agitating slightly for 1 minute to dissolve the CaCO$_3$ on the swatch. Decant the nitric acid into a graduated cylinder. Rinse the swatch twice more with deionized water, decanting the water into the cylinder after each rinse. Add 1 ml of 12% KCl solution to the cylinder, then add deionized water to make up a volume of 200 ml.
11. Filter 30–50 ml of the solution to remove fibers, pour each sample into a labeled container and submit for the determination of ppm calcium with atomic absorption spectroscopy.
12. The percent of CaCO$_3$ was determined according to the following formula:

$$\text{Wt. \% CaCO}_3 = \frac{\text{ppm Ca } x(x)^*}{40(\text{wt. of swatch})}$$

x=(x00) dilution of solution after nitric acid wash, which is 2 in this case. The test results are summarized in Table III.

TABLE III

| Polymer | Wt. % CaCO$_3$, based on weight of Fabric | Visual Color Examination |
|---|---|---|
| NONE (Control) | 1.13 wt. % | Very Gray |
| Polymaleate of Ex. 4 | 0.57 wt. % | Much Less Gray |

The test results in Table III show that fabrics washed with detergent compositions containing the polymaleate of the invention have much less calcium carbonate deposited on the fabric as compared to the fabric without the polymaleate. In addition, Table III also shows that fabrics washed with detergent compositions containing the polymaleate of the invention display significantly less graying as compared to fabrics washed with detergent compositions without the polymaleates of the invention.

While the invention has been described with particular reference to certain embodiments thereof, it will be understood that changes and modifications may be made by those of ordinary skill within the scope and spirit of the following claims.

What is claimed is:

1. A low color or colorless polymaleate as determined by a Gardner color number of 8 or less comprising:
    70 to 100 weight percent, based on the total weight of monomer, of maleic acid; and
    0.5 to 50 μm, based on the moles of monomer, of a polyvalent transition metal ion selected from group consisting of Group IVA, VA, VIA, VIIA, VIIIA, IB, IIB, and combinations thereof;
    wherein said polymaleate is prepared by aqueous solution polymerization, provided that 45 to 55 mole percent of the carboxylic acid groups on the maleic acid are neutralized prior to polymerization.
2. The polymaleate according to claim 1 wherein 45 to 50 mole percent of the carboxylic acid groups on the maleic acid are neutralized prior to polymerization.
3. A textile comprising the polymaleate of claim 1.
4. The polymaleate of claim 3 further comprising a catalyst.
5. A cleaning composition comprising the polymaleate of claim 1.
6. The cleaning composition of claim 5 wherein the polymaleate is present in an amount of 0.1 to 50 weight %, based on total weight of the composition.
7. The cleaning composition of claim 6 wherein the polymaleate is present in an amount of 0.5 to 20 weight %, based on total weight of tire composition.
8. The cleaning composition of claim 5 wherein the cleaning composition is selected from the group consisting of laundry detergents, pre-spotters, dishwashing detergents and hard surface cleaners.
9. The cleaning composition of claim 5 further comprising at least one surfactant.

* * * * *